(12) United States Patent
Kumar et al.

(10) Patent No.: US 12,206,629 B2
(45) Date of Patent: Jan. 21, 2025

(54) METHOD AND SYSTEM TO AUTOMATICALLY RESPOND TO A USER INPUT

(71) Applicant: Dell Products L.P., Round Rock, TX (US)

(72) Inventors: Kuruba Ajay Kumar, Anantapur (IN); Priya Shanmugasundaram, Bangalore (IN); Srishti Gupta, Rohini (IN); Saurabh Jha, Austin, TX (US); Sailendu Patra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/183,285

(22) Filed: Mar. 14, 2023

(65) Prior Publication Data

US 2024/0314090 A1  Sep. 19, 2024

(51) Int. Cl.
| | | |
|---|---|---|
| *G06F 15/16* | (2006.01) | |
| *G10L 15/22* | (2006.01) | |
| *G10L 15/26* | (2006.01) | |
| *H04L 51/02* | (2022.01) | |

(52) U.S. Cl.
CPC .............. *H04L 51/02* (2013.01); *G10L 15/22* (2013.01); *G10L 15/26* (2013.01); *G10L 2015/223* (2013.01)

(58) Field of Classification Search
CPC ......... H04L 51/02; G10L 15/22; G10L 15/26; G10L 2015/223
See application file for complete search history.

(56) References Cited

U.S. PATENT DOCUMENTS

| | | | | |
|---|---|---|---|---|
| 10,489,393 | B1* | 11/2019 | Mittal | G06F 16/2455 |
| 11,294,891 | B2* | 4/2022 | Aggarwal | G06F 16/90332 |
| 11,715,042 | B1* | 8/2023 | Liu | G06N 3/006 |
| | | | | 705/26.1 |
| 11,922,931 | B2* | 3/2024 | Mishra | G10L 15/187 |
| 11,922,942 | B1* | 3/2024 | Kilinc | G10L 15/26 |
| 2021/0350209 | A1* | 11/2021 | Wang | G06F 16/63 |
| 2022/0374209 | A1* | 11/2022 | Shek | G06F 8/33 |
| 2023/0290168 | A1* | 9/2023 | Hasegawa | G06F 16/3349 |
| 2023/0351184 | A1* | 11/2023 | Di Fabbrizio | G06F 18/2155 |
| 2023/0359816 | A1* | 11/2023 | Ioku | G06F 40/216 |
| 2023/0376838 | A1* | 11/2023 | El Hattami | G06F 40/35 |
| 2024/0046235 | A1* | 2/2024 | Braathen | G06Q 30/0201 |
| 2024/0062016 | A1* | 2/2024 | Tong | G06F 40/30 |

(Continued)

*Primary Examiner* — Oleg Survillo
(74) *Attorney, Agent, or Firm* — Chamberlain, Hrdlicka, White, Williams & Aughtry; Aly Dossa

(57) ABSTRACT

A method for automatically responding to a user input includes receiving the user input. The method also includes identifying a current domain associated with the user input. Further, the method includes determining, using a previously trained learning model, a first belief state, where the first belief state is based on the current domain. In addition, the method includes determining, using a reinforcement learning model, a second belief state, where the second belief state is based on the current domain and a reward information. Moreover, the method includes determining an action based on the user input and one selected from the group consisting of the first belief state and the second belief state. Also, the method includes generating a response based on the action and presenting the response to a user.

16 Claims, 5 Drawing Sheets

(56) References Cited

U.S. PATENT DOCUMENTS

2024/0078376 A1* 3/2024 Li .................... G06F 16/583
2024/0160675 A1* 5/2024 Pham ................ G06F 16/9532
2024/0249199 A1* 7/2024 Jeong ................ G06N 20/00

* cited by examiner

1

METHOD AND SYSTEM TO AUTOMATICALLY RESPOND TO A USER INPUT

BACKGROUND

Users may contact a support center to receive support for issues, such as customer support issues, technical support issues, human resources issues, or other issues for which users may request help. The volume of users seeking support for various issues may be extensive and providing resolution to the users' issues may increase user satisfaction SUMMARY In general, embodiments described herein relate to a method for automatically responding to a user input. The method includes receiving the user input. The method also includes identifying a current domain associated with the user input. Further, the method includes determining, using a previously trained learning model, a first belief state, where the first belief state is based on the current domain. In addition, the method includes determining, using a reinforcement learning model, a second belief state, where the second belief state is based on the current domain and a reward information. Moreover, the method includes determining an action based on the user input and one selected from the group consisting of the first belief state and the second belief state. Also, the method includes generating a response based on the action and presenting the response to a user.

In general, embodiments described herein relate to a non-transitory computer readable medium including computer readable program code, which when executed by a computer processor enables the computer processor to perform a method for automatically responding to a user input, the method including receiving the user input. The method also includes identifying a current domain associated with the user input. Further, the method includes determining, using a previously trained learning model, a first belief state, where the first belief state is based on the current domain. In addition, the method includes determining, using a reinforcement learning model, a second belief state, where the second belief state is based on the current domain and a reward information. Moreover, the method includes determining an action based on the user input and one selected from the group consisting of the first belief state and the second belief state. Also, the method includes generating a response based on the action and presenting the response to a user.

In general, embodiments described herein relate to a method for automatically responding to a user input. The method includes receiving the user input. The method also includes identifying a current domain associated with the user input. Further, the method includes determining, using a previously trained learning model, a first belief state, where the first belief state is based on the current domain. In addition, the method includes determining, using a reinforcement learning model, a second belief state, where the second belief state is based on the current domain and a reward information. Moreover, the method includes determining an action based on the user input and one selected from the group consisting of the first belief state and the second belief state. Also, the method includes generating a response based on the action and presenting the response to a user. The method further includes updating the reinforcement learning model based on the belief state, the action, and a previously determined belief state.

Other aspects of the embodiments disclosed herein will be apparent from the following description and the appended claims.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

The following describes one or more embodiments.

Figure 1:
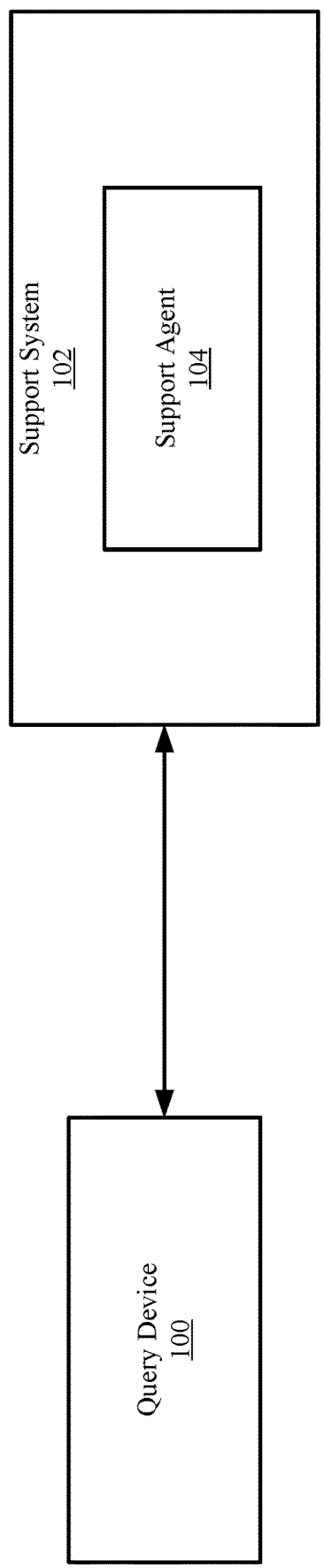
FIG. 1 shows a diagram of a system in accordance with one or more embodiments.

FIG. 1 shows a system in accordance with one or more embodiments. The system may include a query device (100) and a support system (102). Each of these system components is described below.

In one or more embodiments, the query device (100) and the support system (102) may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the query device (100) and the support system (102). Moreover, the query device (100) and the support system (102) may communicate with one another using any combination of wired and/or wireless communication protocols.

In one or more embodiments, the query device (100) may represent any physical computing system whereby one or more users may pose queries (also referred to herein as user inputs) and, subsequently, may receive resources (or information) best fit to address the queries. To that extent, the query device (100) may include functionality to: capture user inputs from users through speech and/or text; delegate the user inputs to the support system (102) for processing; receive resources (i.e., information through one or more forms or formats—e.g., text, images, speech, etc.) from the support system (102), which may address the user inputs; and provide the received resources to the users. One of ordinary skill will appreciate that the query device (100) may perform other functionalities without departing from the scope of the disclosure. Examples of the query device (100) may include, but are not limited to, a desktop computer, a laptop computer, a tablet computer, a smartphone, a smart speaker, any other computing system similar to the exemplary computing system shown in FIG. 5, a telephone, or any other device capable of facilitating communication between a user and the support system (102).

While FIG. 1 shows a configuration of components, other system configurations may be used without departing from the scope of the disclosure. For example, in one embodiment, more than one query device (not shown) may operatively connect to the support system (102).

In one or more embodiments, the support system (102) includes a support agent (104) that includes functionality to receive user inputs and provide responses to the user inputs via the query device (100). With this functionality, the support agent (104) may engage in a conversation with a user. To do so, the support agent (104) may represent a natural language processing platform to provide a generalized dialogue management system for responding to user inputs and providing support to users to aid in solving various issues, such as customer support issues, technical support issues, human resources issues, or other issues.

In one embodiment, the support system (102) may be implemented using one or more computing servers (not shown). Each server may represent a physical server that may reside in a datacenter, or a virtual server that may reside in a cloud computing environment. Additionally or alternatively, the support system (102) may be implemented using one or more computing systems similar to the exemplary computing system shown in FIG. 5.

Figure 2:
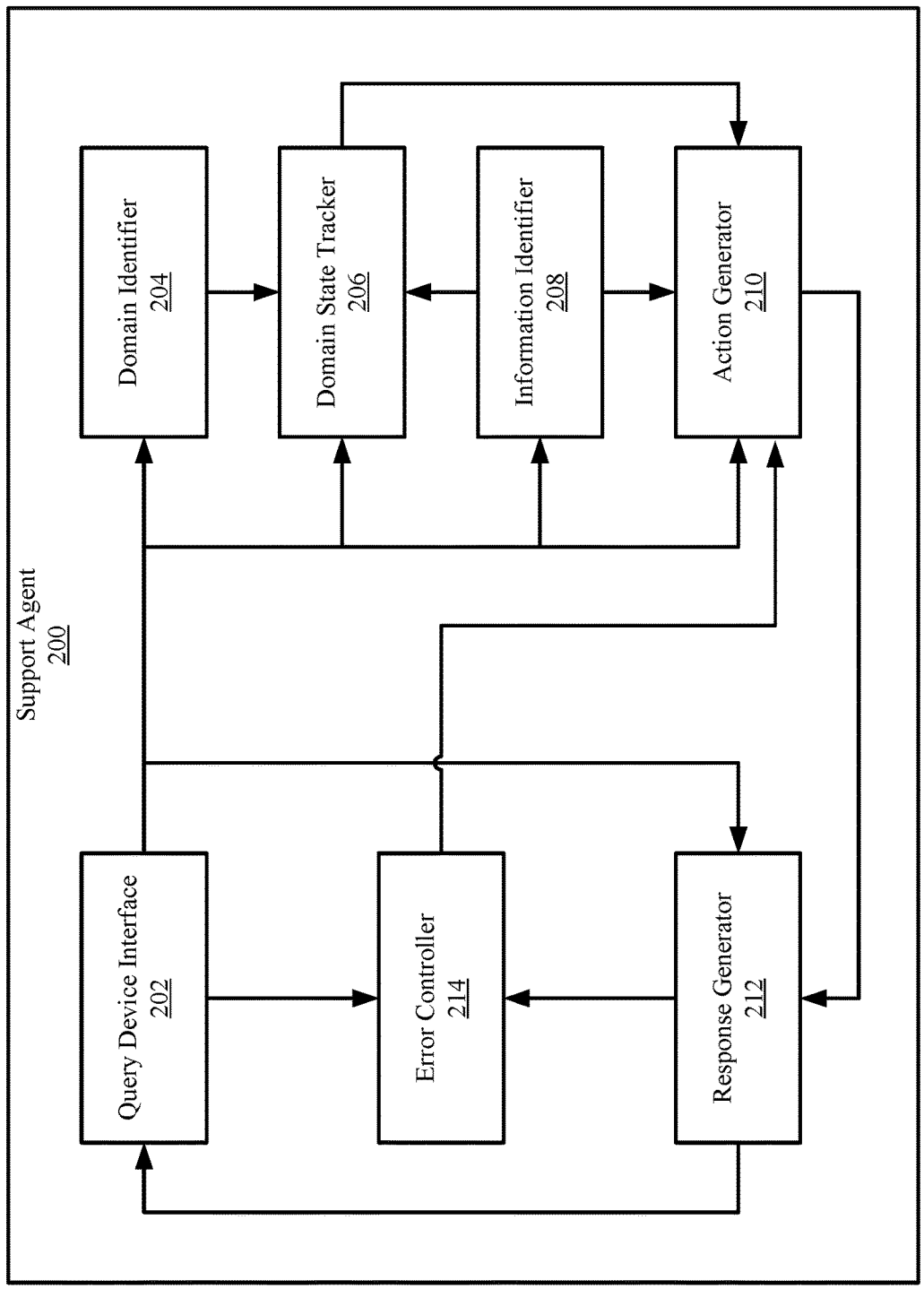
FIG. 2 shows a diagram of a support agent in accordance with one or more embodiments.

FIG. 2 shows a support agent (200) in accordance with one or more embodiments. The support agent (200) includes a query device interface (202), a domain identifier (204), a domain state tracker (206), an information identifier (208), an action generator (210), a response generator (212), and an error controller (214). Each of these system components is described below.

Figure 4:
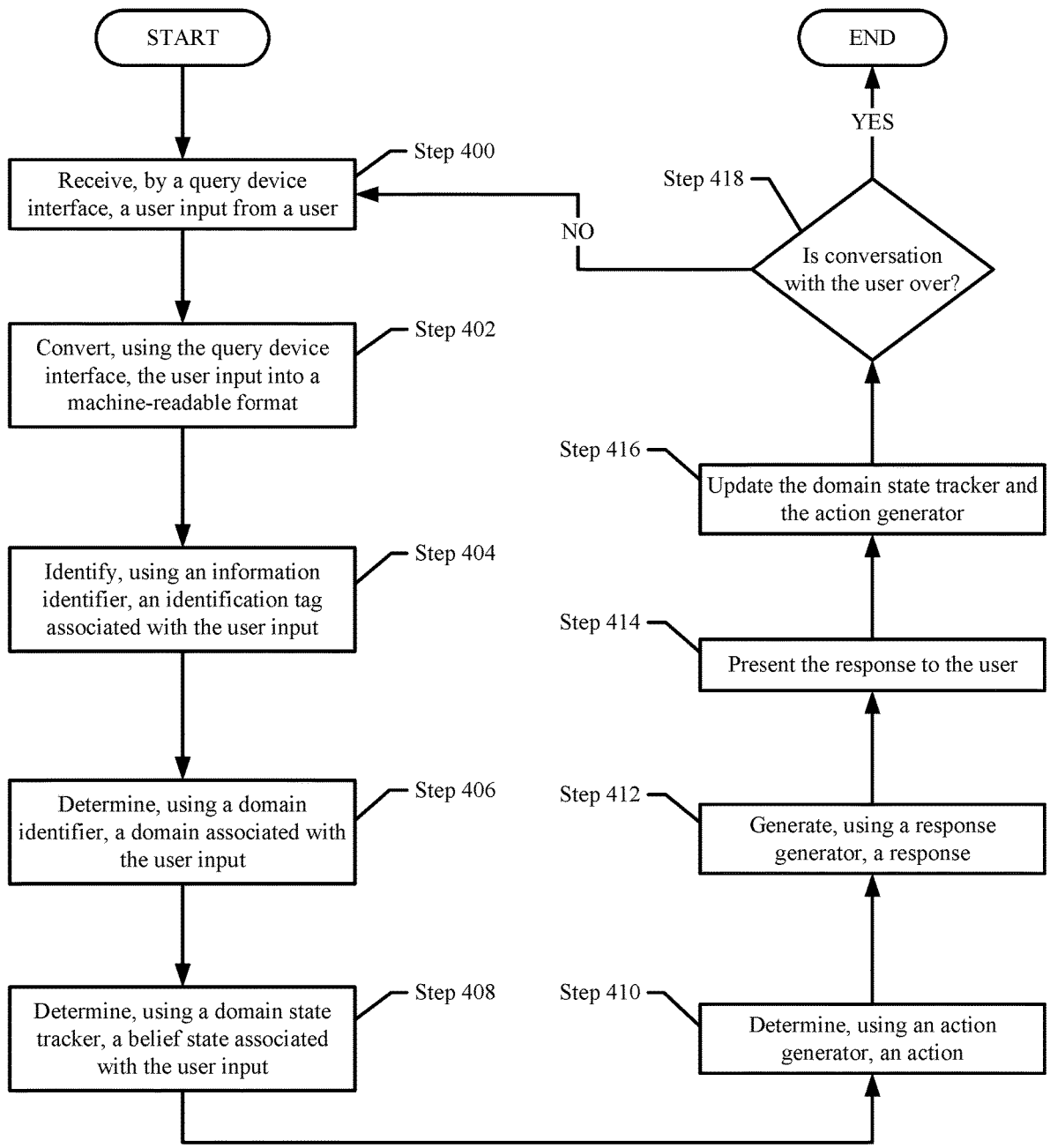
FIG. 4 shows a flowchart of a method for automatically responding to a user input in accordance with one or more embodiments.
Figure 5:
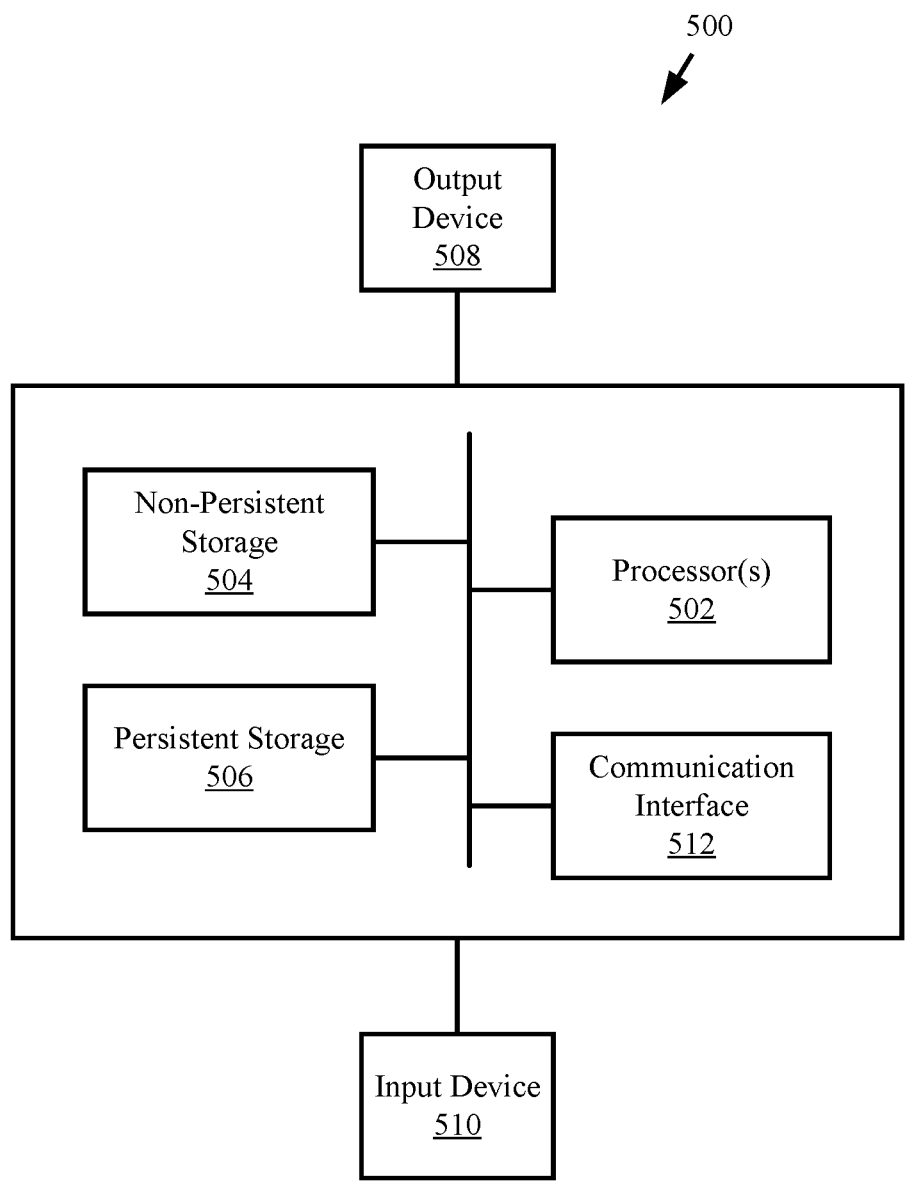
FIG. 5 shows a computing system in accordance with one or more embodiments.

In one or more embodiments, one or more of the query device interface (202), the domain identifier (204), the domain state tracker (206), the information identifier (208), the action generator (210), the response generator (212), and the error controller (214) are implemented as a computing device (see e.g., FIG. 5). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the associated component described throughout this application and/or all, or a portion thereof, of the method illustrated in FIG. 4.

In one or more embodiments, one or more of the query device interface (202), the domain identifier (204), the domain state tracker (206), the information identifier (208), the action generator (210), the response generator (212), and the error controller (214) are implemented as a logical device. The logical device may utilize the computing resources of the support agent (200) and thereby provide the functionality of the associated component described throughout this application and/or all, or a portion thereof, of the method illustrated in FIG. 4.

In one or more embodiments, the query device interface (202) may be designed and configured to facilitate communications between the support agent (200) and any query device (not shown) (see e.g., FIG. 1). To that extent, the query device interface (202) may include functionality to: receive user inputs (e.g., audio or textual information) from a query device; perform preliminary processing to convert the user inputs into a machine-readable format (described below); provide the user inputs to the other components of the support agent (200); receive responses, which may or may not address the user inputs, from the response generator (212); provide the responses to the query device; receive feedback (i.e., additional user inputs reflecting whether the responses properly addressed the user inputs) from the query device; and repeat all of the above to form a conversation with a user.

In one or more embodiments, the query device interface (202) may be designed and configured to convert user inputs, if received in any spoken language or audio data format, into a textual data format. To that extent, the query device interface (202) may include functionality to: transcribe audio-formatted user inputs into text-formatted user inputs using any existing speech recognition or speech-to-text algorithm; and provide the text-format input queries to the other components of the support agent (200) for processing. If the input queries are already textually formatted when received, then the query device interface (202) may include further functionality to circumvent the data format conversion process and, subsequently, provide the other components of the support agent (200) with the received user inputs. One of ordinary skill will appreciate that the query device interface (202) may perform other functionalities without departing from the scope of the disclosure.

In one or more embodiments, the domain identifier (204) may be designed and configured to receive the user inputs from the query device interface (202) and identify the domain (also referred to as intent herein) of the user input. For example, a user asking about a status of an order is identified as having a domain of order status while a user expressing a desire to return an item is identified as having a domain of order return. To provide this functionality, the domain identifier (204) may utilize machine learning and natural language processing techniques to identify the domain. For example, the domain identifier (204) may utilize a multi-layer bidirectional transformer encoder-based model. The domain identifier (204) can receive the user input, which may be characterized as a small, labeled dataset, and provide the classifications associated with the user input. The domain identifier (204) may utilize attention-based, span-based convolutions to accommodate contextual information in the text, thus increasing the accuracy of the model.

In one or more embodiments, the domain state tracker (206) may be designed and configured to receive the user inputs from the query device interface (202), the domain of the current user input from the domain identifier (204), and the identification tag(s) from the information identifier (208) (described below). The domain state tracker (206) may also utilize a history of each of these inputs in providing its functionality (as described below). In one or more embodiments, the action generator (210) may utilize any combination of the above information as inputs. Based on the current inputs and the history of the inputs, the domain state tracker (206) determines the belief state of the overall conversation with the user, thereby providing contextual information for each user input. Further, the domain state tracker (206) may receive an error cost from the error controller (214) (described below) to update the domain state tracker (206) after each user input or after a number of user inputs, including a predetermined number of user inputs. The functionality of the domain state tracker (206) is described in further detail below in reference to FIG. 3.

In one or more embodiments, the information identifier (208) may be designed and configured to receive the user inputs from the query device interface (202) and identify actionable items and label each item with an identification tag. For example, the information identifier (208) may recognize the portion of the user input that represents a name and label that portion of the user input as a name. It should be appreciated that the information identifier may recognize any number of portions of the user input and provide any number of identification tags to each portion. To provide this functionality, the information identifier (208) may utilize machine learning and natural language processing techniques to identify and provide the identification tags. For example, the information identifier (208) may utilize a multi-layer bidirectional transformer encoder-based model. The information identifier (208) can receive the user input, which may be characterized as a small, labeled dataset, and provide the classifications associated with the user input. The information identifier (208) may utilize attention-based, span-based convolutions to accommodate contextual information in the text, thus increasing the accuracy of the model.

In one or more embodiments, the action generator (210) may be designed and configured to receive the user inputs from the query device interface (202), the belief state of the conversation from the domain state tracker (206), the identification tag(s) from the information identifier (208), and/or an error cost from the error controller (214) (described below). The action generator (210) may also utilize a history of each of these inputs in providing its functionality. In one or more embodiments, the action generator (210) may utilize any combination of the above information as inputs. Further, using the error cost as an input causes the support agent (200) to be considered a closed-loop system because it utilizes feedback in generating outputs. Based on the current inputs and the history of the inputs, the action generator (210) determines an action, which may include one or more actions, which serves as the intent of the response to the user input. Further, the action generator (210) may also determine a schema for presenting the action, for example by ordering the actions. To provide this functionality, the action generator (210) may utilize machine learning and natural language processing techniques to determine and provide the action. For example, the action generator (210) may utilize a transformer model that uses an encoder-decoder architecture. Further, the action generator (210) may receive the error cost from the error controller (214) to update the action generator (210) after each user input or after a number of user inputs, including a predetermined number of user inputs.

In one or more embodiments, the response generator (212) may be designed and configured to receive the user inputs from the query device interface (202) and the action and/or the schema provided by the action generator (210) and generate a response that is in a plain language for a user. To provide this functionality, the response generator (212) may utilize machine learning and natural language processing techniques to determine and provide the action. For example, the response generator (212) may utilize a transformer model trained on a large conversational dataset to provide a natural language response to the user that also captures the action generated by the action generator (210). The response generator (212) then provides the response to the query device interface (202) which can present the response to the user.

In one or more embodiments, the error controller (214) may be designed and configured to receive the user inputs from the query device interface (202) and the response from the response generator (212) to generate an error cost via a reward function. The error cost represents whether the response provided to the user results in positive feedback or negative feedback, and the degree of the feedback. The error cost may then be provided to the action generator (210) to update the action generator (210) and/or be provided as an input to the action generator (210). For example, if the error cost represents negative feedback, the action generator (210) will be updated to avoid providing a similar action in response to a similar set of inputs. Conversely, if the error cost represents positive feedback, the action generator (210) will be updated to repeat a similar action in response to a similar set of inputs.

Figure 3:
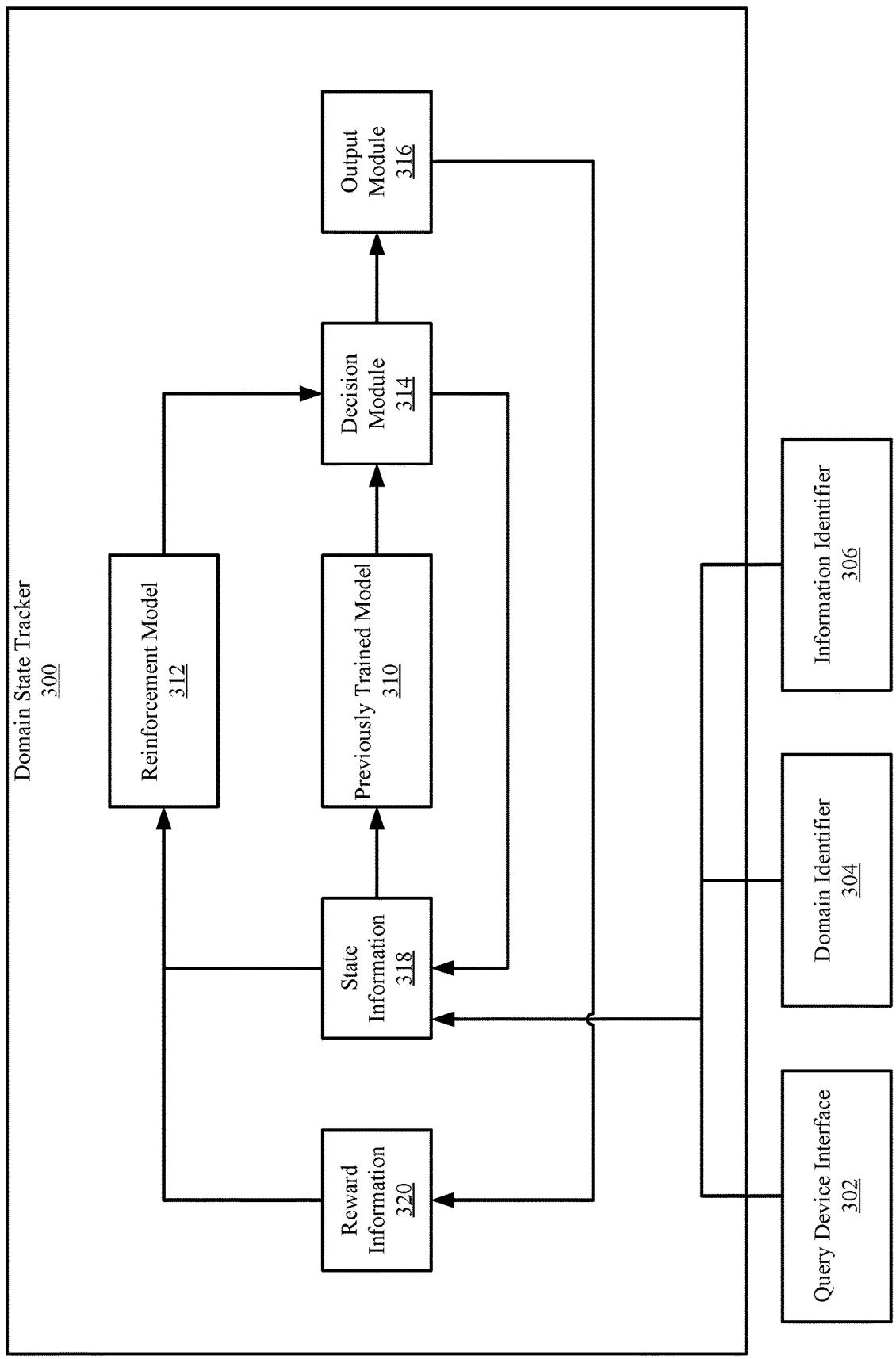
FIG. 3 shows a diagram of a domain state tracker in accordance with one or more embodiments.

Turning to FIG. 3, FIG. 3 shows a domain state tracker (300) (i.e., the domain state tracker (206) of FIG. 2) in accordance with one or more embodiments. The domain state tracker (300) includes a previously trained model (310), a reinforcement model (312), a decision module (314), an output module (316), state information (318), and reward information (320).

In one or more embodiments, the state information (318) is a compilation of data received by the domain state tracker (300). The state information (318) may receive the user inputs from a query device interface (302) (e.g., the query device interface (202) in FIG. 2), the domain from a domain identifier (304) (e.g., the domain identifier (204) in FIG. 2), and the identification tags from an information identifier (306) (e.g., the information identifier (208) in FIG. 2). Further, the state information (318) may store all past iterations of each of these inputs, which may collectively be referred to as a conversation history. Further, in one or more embodiments, the state information (318) may include any combination of the above-mentioned inputs.

In one or more embodiments, the previously trained model (310) includes a machine learning model such as a supervised learning model. The previously trained model (310) may be trained using large, labelled datasets of conversations, which, when provided with the state information (318), produces a first proposed belief state. Because the previously trained model (310) is trained using a large dataset, the previously trained model (310) may be considered an expert at producing the first proposed belief state. However, while the previously trained model (310) may produce very accurate results when the state information (318) closely matches the training data, the previously trained model may have reduced accuracy when the state information (318) is different from the training data. As such, the domain state tracker also includes the reinforcement model (312).

In one or more embodiments, the reinforcement model (312) includes a machine learning model such as a reinforcement model. The reinforcement model (312) receives the state information (318) and the reward information (320) (discussed below) and produces a second proposed belief state, which may or may not be different from the first proposed belief state produced by the previously trained model (310). As such, because the reinforcement model (312) receives both the state information (318), which provides the conversational data, and the reward information (320), which provides a tracking of how well the conversation is progressing, the reinforcement model (312) may be biased to engage in exploratory actions that produces belief states that the previously trained model (310) would be incapable of producing. As such, the domain state tracker (300) may dynamically track the belief state of a conversation with a user and respond to new and/or unseen user inputs.

In one or more embodiments, the decision module (314) includes functionality to receive the first proposed belief state from the previously trained model (310) and the second proposed belief state from the reinforcement model (312) and select one as the output. In one embodiment, the decision module (314) selects the belief state based on a difference between the first proposed belief state and the second proposed belief state. In one embodiment, the difference includes a magnitude of the l2 norm of the difference between the first proposed belief state and the second proposed belief state. As discussed above, the belief state produced by the previously trained model (310) may be considered the expert belief state meaning, it is the more expected belief state. Further, as described above, the reinforcement model (312) may produce exploratory belief states. However, the second belief state might be too exploratory. Thus, the decision module (314) may select the first belief state if the difference between the first belief state and the second belief state exceeds a threshold value or the second belief state if the difference between the first belief state and the second belief state does not exceed the threshold value. After selecting either the first belief state or the second belief state to be the output belief state, the decision module (314) sends the selected belief state to the output module (316).

In one or more embodiments, the output module (316) receives the selected belief state and sends the selected belief state to other components, such as the action generator (210). In one embodiment, the output module (316) may also be utilized to produce the reward information (320). In one or more embodiments, the reward information (320) includes a difference between the second belief state and the selected belief state, a number of user inputs received in a conversation with the user, and a result of the conversation. In one embodiment, the difference includes a magnitude of the l2 norm of the difference between the second belief state and the selected belief state. For example, the difference may be zero if the selected belief state is the second belief state. Further, in one embodiment, the number of user inputs represents how many rounds of conversation have occurred between the user and the support agent, where one round is a user input and a response to the user input. In one embodiment, the result of the conversation may be a binary number based on a determination that the conversation resulted in the user being provided with the information sought (a success) or the user not being provided with the information sought (a failure). As such, the reward information changes and is updated every time a new user input is received and every time the reinforcement model (312) produces a belief state.

Automatically Responding to User Inputs:

Users may experience various issues in their day-to-day lives and in the process of interacting with devices. In response, users may contact another person and/or device to help resolve their issues. There are many automated systems provided to help users resolve their issues; however, users may become frustrated with current systems and attempt to bypass such automated systems or give-up on such systems and be left with unresolved issues. The method of FIG. 4 significantly improves the user experience with an automated response system by utilizing a natural language processing platform to provide a generalized dialogue management system for responding to user inputs. The method of FIG. 4 may utilize a closed-loop system that provides feedback to provide an automated response system that can dynamically adjust to a conversation with a user, thereby providing more accurate responses to the user and engaging in longer conversations with users while also maintaining accurate responses.

Turning to FIG. 4, FIG. 4 shows a flowchart describing a method for automatically responding to user inputs in accordance with one or more embodiments disclosed herein. The method may be performed by, for example, the support agent (200, FIG. 2).

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 400, a query device interface (e.g., the query device interface (202) in FIG. 2) receives a user input from a user via a query device (e.g., the query device (100) in FIG. 1). The user input may include any type of user input that conveys a communication, including text input, voice input, menu selection, and/or image input.

In step 402, the query device interface converts the user input into a machine-readable format. In some instances, such as a text input, the query device may not need to perform any conversion. However, other inputs may need to be converted into a text input. For example, a voice input may be converted into a text input using voice-to-text methods. Further, in one embodiment, after the input has been converted into a text input, the text input may further be converted into other forms of digital data to enable other components to perform processing on the input.

In step 404, an information identifier (e.g., the information identifier (208) in FIG. 2) identifies an identification tag associated with the user input. In one embodiment, the identification tag is an actionable item. The information identifier receives the user input, for example in the machine-readable format, and outputs the identified information tag(s). For example, the information identifier may recognize the portion of the user input that represents a name and label that portion of the user input as a name. In this example, the identification tag would be "name" and the name an actionable item. It should be appreciated, that the information identifier may identify any number of portions of the user input and provide any number of identification tags to each portion.

In step 406, a domain identifier (e.g., the domain identifier (204) in FIG. 2) determines a domain associated with the user input. The domain identifier receives the user input, for example in the machine-readable format, and outputs the domain, which may also be considered the intent of the user input. For example, a user input asking about a status of an order is determined as having a domain of order status, while a user input expressing a desire to return an item is determined as having a domain of order return. As such, the information identifier provides information tags for each portion of the user input, while the domain identifier provides the overall intent of the whole user input.

In step 408, a domain state tracker (e.g., the domain state tracker (206) in FIG. 2) determines a belief state associated with the user input, as discussed above. The domain state tracker receives the user input, the identification tag(s), and/or the domain as current outputs. Further, the domain state tracker also stores a history of past inputs and/or its own outputs. The domain state tracker utilizes any combination of this data as an input and determines the belief state based on the input, as described above.

In step 410, an action generator (e.g., the action generator (210) in FIG. 2) determines an action. The action generator receives the user input, for example in the machine-readable format, the belief state, the identification tag(s), and/or an error cost from an error controller (e.g., the error controller (214) in FIG. 2) as inputs and outputs the action. Further, the action may include one or more actions, with each action representing an intent of a response to a user input. For example, based on a user input requesting an order status the action generator may generate an action that includes requesting more information from the user, or if the information is complete, the action may include the order status. Further, the action may also include a schema to present the actions in a proper order.

In step 412, a response generator (e.g., the response generator (212) in FIG. 2) generates a response. The response generator receives the user input, for example in the machine-readable format, and the action, including the action schema, and generates a response that is understandable by a user. The response generator then sends the response to the query device interface.

In step 414, the query device interface presents the response to the user. After receiving the response from the response generator, the query device interface may send the response to the query device. In one embodiment, the query device interface receives the response and converts the response into a different format. For example, the response may be in a text format, but the user is communicating using voice. So, the query device interface converts the text response into a voice response, and then presents the voice response to the user.

In step 416, the domain state tracker and/or the action generator are updated after one or more user inputs and associated responses. In one embodiment, data may be compiled into chunks that include the belief state, the action, the error cost, the reward information (e.g., the reward information (320) in FIG. 3), and the next belief state. In this embodiment, the chunks are then used to update the domain state tracker. Further, the chunks may be prioritized based on their associated time delay error and their learning efficiency. In one embodiment, the error cost may be utilized to update the action generator.

In step 418, the support agent determines whether the conversation with the user is over. If the support agent determines that the conversation is not over (e.g., by receiving another user input), then the method continues back to step 400. If the support agent determines that the conversation is over (e.g., by the user indicating the conversation is over or a threshold time since a user input is exceeded), then the method may end following step 418.

As discussed above, embodiments of the disclosure may be implemented using computing devices. FIG. 5 shows a diagram of a computing device (500) in accordance with one or more embodiments. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. The communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (508, 510) may be locally or remotely connected to the computer processor(s) (502), non-persistent storage (504), and persistent storage (506). Many diverse types of computing devices exist, and the aforementioned input and output device(s) (508, 510) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for automatically responding to a user input, the method comprising:
   receiving the user input;
   identifying a current domain associated with the user input;
   determining, using a previously trained learning model, a first belief state, wherein the first belief state is based on the current domain;
   determining, using a reinforcement learning model, a second belief state, wherein the second belief state is based on the current domain and a reward information,
      wherein the reward information comprises at least one selected from the group consisting of: a difference between a previously selected belief state and a previously determined second belief state, a number of user inputs received in a conversation with the user, and a result of the conversation,
      wherein the previously determined second belief state is determined using the reinforcement learning model and the previously selected belief state comprises one of the previously determined second belief state and a previously determined first belief state, and
      wherein the previously determined first belief state is determined using the previously trained learning model;
   selecting one of the first belief state and the second belief state, wherein the selection is based on a difference between the first belief state and the second belief state;
   determining an action based on the user input and the selection;
   generating a response based on the action; and
   presenting the response to a user.

2. The method of claim 1, further comprising:
   determining an identification tag associated with the user input and wherein the action is also based on the identification tag.

3. The method of claim 2, wherein the identification tag is determined using a natural language processing technique.

4. The method of claim 1, further comprising:
   receiving a second user input;
   identifying a second current domain associated with the second user input;
   determining, using the previously trained learning model, a third belief state, wherein the third belief state is based on the second current domain and the user input;
   determining, using the reinforcement learning model, a fourth belief state, wherein the second belief state is based on the second current domain, the current domain, the user input, and the reward information;
   determining a second action based on the second user input and one selected from the group consisting of: the third belief state and the fourth belief state;

generating a second response based on the second action; and
   presenting the second response to the user.

5. The method of claim 1, wherein the action is determined using a transformer model.

6. The method of claim 5, further comprising:
   generating an error cost based on the user input and the response, and wherein the action is based on the error cost.

7. The method of claim 1,
   wherein the user input is a voice input, and
   wherein the method further comprises:
      converting the voice input into text before identifying the current domain.

8. A method for automatically responding to a user input, the method comprising:
   receiving the user input;
   identifying a current domain associated with the user input;
   determining, using a previously trained learning model, a first belief state, wherein the first belief state is based on the current domain;
   determining, using a reinforcement learning model, a second belief state, wherein the second belief state is based on the current domain and a reward information,
      wherein the reward information comprises at least one selected from the group consisting of: a difference between a previously selected belief state and a previously determined second belief state, a number of user inputs received in a conversation with the user, and a result of the conversation,
      wherein the previously determined second belief state is determined using the reinforcement learning model and the previously selected belief state comprises one of the previously determined second belief state and a previously determined first belief state, and
      wherein the previously determined first belief state is determined using the previously trained learning model;
   selecting one of the first belief state and the second belief state, wherein the selection is based on a difference between the first belief state and the second belief state;
   determining an action based on the user input and the selection;
   generating a response based on the action;
   presenting the response to a user; and
   updating the reinforcement learning model based on one selected from the group consisting of: the first belief state and the second belief state, the action, and the previously determined belief state.

9. The method of claim 8, further comprising:
   receiving a second user input;
   identifying a second current domain associated with the second user input;
   determining, using the previously trained learning model, a third belief state, wherein the third belief state is based on the second current domain and the user input;
   determining, using the reinforcement learning model, a fourth belief state, wherein the fourth belief state is based on the second current domain, the current domain, the user input, and the reward information;
   determining a second action based on the second user input and one selected from the group consisting of: the third belief state and the fourth belief state;

generating a second response based on the second action; and presenting the second response to the user.

10. A non-transitory computer readable medium comprising computer readable program code, which when executed by a computer processor enables the computer processor to perform a method for automatically responding to a user input, the method comprising:

receiving the user input;

identifying a current domain associated with the user input;

determining, using a previously trained learning model, a first belief state, wherein the first belief state is based on the current domain;

determining, using a reinforcement learning model, a second belief state, wherein the second belief state is based on the current domain and a reward information, wherein the reward information comprises at least one selected from the group consisting of: a difference between a previously selected belief state and a previously determined second belief state, a number of user inputs received in a conversation with the user, and a result of the conversation, wherein the previously determined second belief state is determined using the reinforcement learning model and the previously selected belief state comprises one of the previously determined second belief state and a previously determined first belief state, and wherein the previously determined first belief state is determined using the previously trained learning model;

selecting one of the first belief state and the second belief state, wherein the selection is based on a difference between the first belief state and the second belief state;

determining an action based on the user input and the selection;

generating a response based on the action; and presenting the response to a user.

11. The non-transitory computer readable medium of claim 10, wherein the method further comprises:

determining an identification tag associated with the user input and wherein the action is also based on the identification tag.

12. The non-transitory computer readable medium of claim 11, wherein the identification tag is determined using a natural language processing technique.

13. The non-transitory computer readable medium of claim 10, wherein the method further comprises:

receiving a second user input;

identifying a second current domain associated with the second user input;

determining, using the previously trained learning model, a third belief state, wherein the third belief state is based on the second current domain and the user input;

determining, using the reinforcement learning model, a fourth belief state, wherein the second belief state is based on the second current domain, the current domain, the user input, and the reward information;

determining a second action based on the second user input and one selected from the group consisting of: the third belief state and the fourth belief state;

generating a second response based on the second action; and presenting the second response to the user.

14. The non-transitory computer readable medium of claim 10, wherein the action is determined using a transformer model.

15. The non-transitory computer readable medium of claim 14, wherein the method further comprises:

generating an error cost based on the user input and the response, and wherein the action is based on the error cost.

16. The non-transitory computer readable medium of claim 10, wherein the user input is a voice input, and wherein the method further comprises:

converting the voice input into text before identifying the current domain.

* * * * *